(12) United States Patent
Hongu et al.

(10) Patent No.: US 9,160,922 B2
(45) Date of Patent: Oct. 13, 2015

(54) SUBJECT DETECTION DEVICE AND CONTROL METHOD FOR THE SAME, IMAGING APPARATUS, AND STORAGE MEDIUM

(71) Applicant: CANON KABUSHIKI KAISHA, Tokyo (JP)

(72) Inventors: Hideyasu Hongu, Tokyo (JP); Makoto Yokozeki, Tokyo (JP); Kazunori Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/307,384

(22) Filed: Jun. 17, 2014

(65) Prior Publication Data

US 2014/0376813 A1  Dec. 25, 2014

(30) Foreign Application Priority Data

Jun. 19, 2013  (JP) ................................. 2013-128286

(51) Int. Cl.
G06K 9/62  (2006.01)
H04N 5/232  (2006.01)
G06K 9/00  (2006.01)

(52) U.S. Cl.
CPC ........ *H04N 5/23219* (2013.01); *G06K 9/00228* (2013.01)

(58) Field of Classification Search
None
See application file for complete search history.

(56) References Cited

U.S. PATENT DOCUMENTS

| 2007/0291155 | A1* | 12/2007 | Kawaguchi et al. ..... 348/333.12 |
| 2008/0158407 | A1* | 7/2008 | Funamoto ..................... 348/345 |
| 2010/0245612 | A1* | 9/2010 | Ohashi et al. .............. 348/222.1 |
| 2011/0273578 | A1* | 11/2011 | Okamoto ................... 348/222.1 |
| 2012/0121129 | A1* | 5/2012 | Okamoto ...................... 382/103 |
| 2013/0051677 | A1* | 2/2013 | Lee ................................ 382/192 |
| 2014/0247374 | A1* | 9/2014 | Murakami et al. ......... 348/222.1 |

FOREIGN PATENT DOCUMENTS

| JP | 2002-251380 A | 9/2002 |
| JP | 2008-40710 A | 2/2008 |
| JP | 2009-211311 A | 9/2009 |

* cited by examiner

*Primary Examiner* — Brian P Werner
(74) *Attorney, Agent, or Firm* — Canon USA, Inc. I.P. Division

(57) ABSTRACT

A subject detection device includes: a first detection unit that detects a region of a first detection target from an image; a second detection unit that detects from the image a region of a second detection target from which the region of the first detection target can be estimated; and a control unit that controls to display in a predetermined mode indicating the region of the first detection target if a predetermined condition is satisfied, wherein when the first detection unit detects the region of the first detection target and the second detection unit detects the region of the second detection target when the control unit controls to not display in the predetermined mode, the control unit reduces the predetermined condition as compared with when the region of the second detection target is not detected.

18 Claims, 12 Drawing Sheets

<SUBJECT MINIMUM DETECTION SIZE>

<IN CASE OF ONLY FACE DETECTION>

<IN CASE OF FACE DETECTION + HUMAN BODY DETECTION>

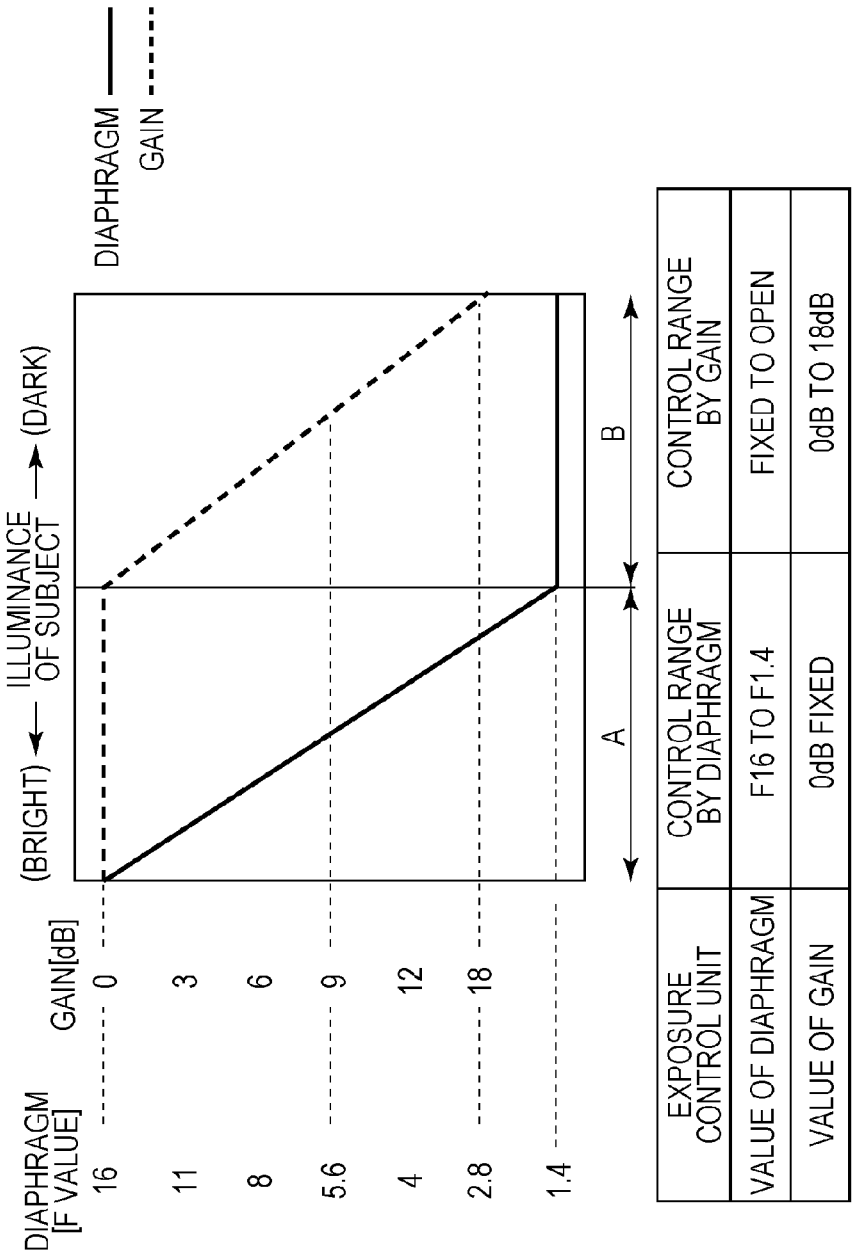

SUBJECT DETECTION DEVICE AND CONTROL METHOD FOR THE SAME, IMAGING APPARATUS, AND STORAGE MEDIUM

BACKGROUND

1. Field of the Disclosure

Aspects of the present invention generally relate to a subject detection device and a control method for the same, an imaging apparatus to which the subject detection device is applied, and the like.

2. Description of the Related Art

It has been known that in a subject detection device such as a video camera, a region having a particular pattern such as a human face (subject region) is detected based on an image signal generated in an imaging element. It has also been known that based on the detected subject region, controls including the automatic focusing (AF) control and the automatic exposure (AE) control are conducted and a frame defining the subject region is displayed. Furthermore, in order to increase the degree of freedom of the subject, a subject other than the human face can also be detected. For example, Japanese Patent Application Laid-Open No. 2009-211311 has disclosed image processing apparatus and method that detect the upper half of a human body.

For improving the detection accuracy, Japanese Patent Application Laid-Open No. 2008-40710 has disclosed a method of detecting a subject having a particular pattern while compensating various drawbacks by a first detection method using hardware (luminance information) and a second detection method using software (color information) with respect to the subject.

When the subject is detected, the detection state and the non-detection state may be repeated depending on the state of the subject. In this case, since the display and the non-display of the detection frame representing the subject detection result are switched repeatedly, the frame display flickers on the display screen. Further, when AF control or AE control is performed on the detected subject, the presence or absence of the control target changes repeatedly; therefore, the control may be unstable. In particular, as for the subject that is as small as the lower limit of the size capable of subject detection, the detection state may be unstable in the occurrence of the minute change of the subject size.

SUMMARY OF THE INVENTION

According to aspects of the present invention, when the control is conducted based on the result of detecting a particular subject region, the deterioration in stability of the control that is caused by the change in detection state of the subject is suppressed.

According to an aspect of the present invention, a subject detection device includes: a first detection unit that detects a region of a first detection target from an image; a second detection unit that detects from the image a region of a second detection target from which the region of the first detection target can be estimated; and a control unit that controls to display in a predetermined mode indicating the region of the first detection target if a predetermined condition is satisfied, wherein when the first detection unit detects the region of the first detection target and the second detection unit detects the region of the second detection target when the control unit controls to not display in the predetermined mode, the control unit reduces the predetermined condition as compared with when the region of the second detection target is not detected.

Further features of the present invention will become apparent from the following description of exemplary embodiments (with reference to the attached drawings).

BRIEF DESCRIPTION OF THE DRAWINGS

FIG. 13 is a diagram illustrating the AE control operation according to an exemplary embodiment.

DESCRIPTION OF THE EMBODIMENTS

Figure 1:
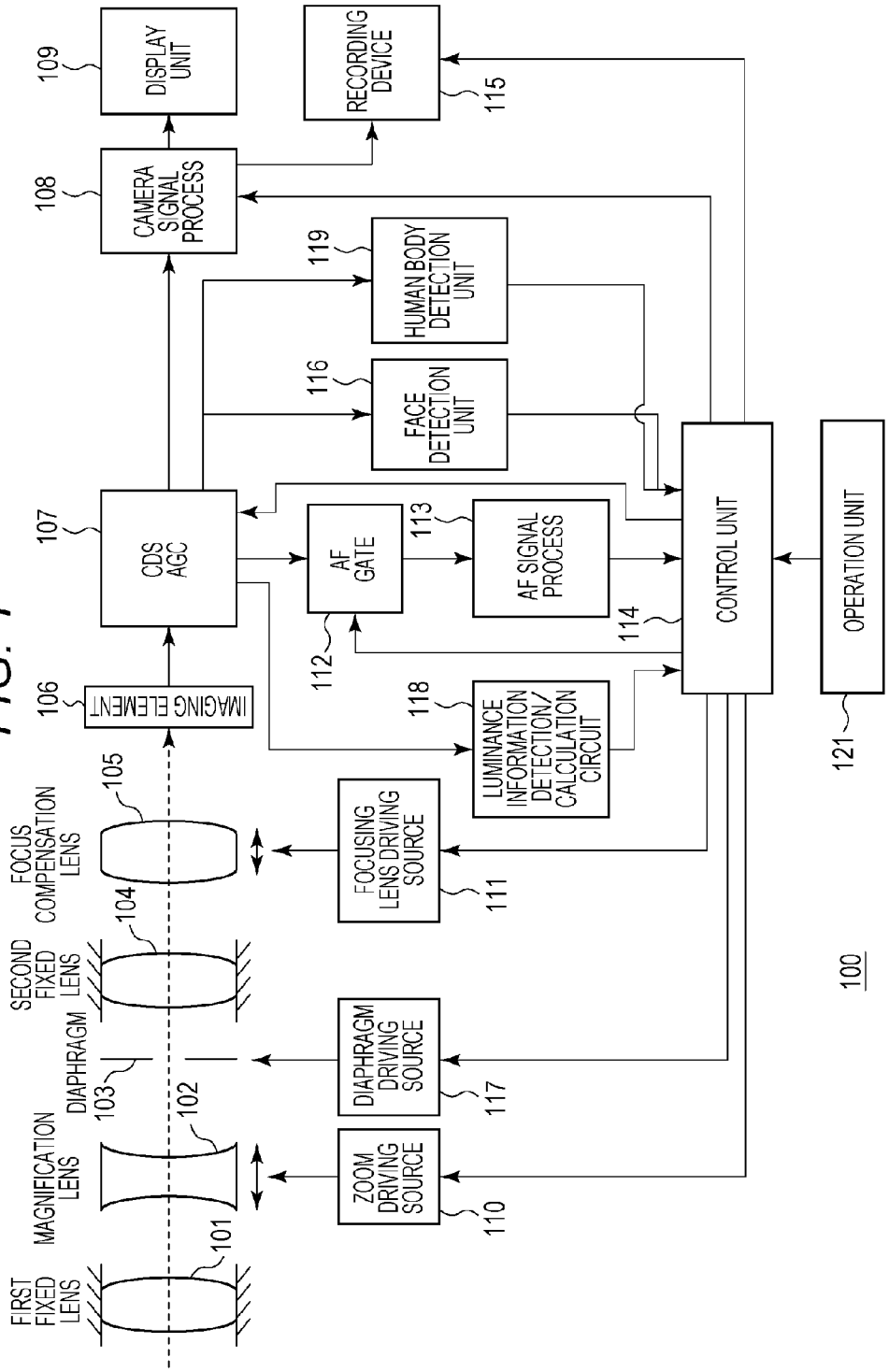
FIG. 1 is a block diagram illustrating a functional configuration example of a digital video camera to which a subject detection device is applied according to an exemplary embodiment.

An exemplary embodiment is hereinafter described in detail with reference to the drawings. FIG. 1 is a block diagram illustrating a functional configuration example of a digital video camera as an example in which a subject detection device according to this embodiment is applied to an imaging apparatus.

In FIG. 1, a digital video camera 100 according to this embodiment includes an imaging optical system for focusing light from a subject. The imaging optical system includes a first fixed lens 101, a magnification lens 102 that magnifies while moving in an optical axis direction, a diaphragm 103, a second fixed lens 104, and a focus compensation lens 105. The focus compensation lens (hereinafter simply referred to as a focusing lens) 105 has both the function of correcting the movement of the focal plane in accordance with the magnification and the function of focusing. Although this embodiment describes the video camera having the imaging optical system integrated, embodiments of the present invention are also applicable to an exchangeable lens type. Moreover, embodiments of the present invention are applicable to not just a digital video camera but also to a single lens reflex camera, a compact digital camera, or a tablet-type terminal or a portable communication appliance having a camera function.

An imaging element 106 includes a photoelectric conversion element such as a CCD sensor or a CMOS sensor. The imaging element 106 outputs an image signal by performing photoelectric conversion on a subject image formed by the imaging optical system. A CDS/AGC circuit 107 performs correlated double sampling on the output of the imaging element 106 and adjusts the gain.

A camera signal processing circuit 108 performs various image processes on the output signal from the CDS/AGC circuit 107, and generates a video signal. A display unit 109 includes an LCD or the like, and displays an image based on the signals from the camera signal processing circuit 108. A recording unit 115 records the signals from the camera signal processing circuit 108 in a recording medium (such as a magnetic tape, an optical disc, or a semiconductor memory). The recording medium may be either the medium that is removably attached to the digital video camera 100 or the medium that is connected thereto via a network.

A zoom driving unit 110 moves the magnification lens 102 in response to the control of the control unit 114. A focusing lens driving unit 111 moves the focusing lens 105 in response to the control of the control unit 114. The zoom driving unit 110 and the focusing lens driving unit 111 are formed by an actuator such as a stepping motor, a DC motor, a vibration-type motor, or a voice coil motor. The information on the position of the focusing lens 105 is supplied to the control unit 114 through the focusing lens driving unit 111 or another structure.

An AF gate 112 supplies to an AF signal processing circuit 113 in the rear stage, a signal in a region used for the focal point detection set by the control unit 114 (focal point detection region or region corresponding to the AF frame) among the output signals of the entire pixels from the CDS/AGC circuit 107.

The AF signal processing circuit 113 generates the AF evaluation value by extracting a component of a predetermined frequency range through a filter from the pixel signals in the focal point detection region supplied from the AF gate 112. The component to be extracted may include, for example, a high-frequency component or a luminance difference component (difference between the maximum value and the minimum value of the luminance level of the signal having transmitted through the AF gate 112).

The AF evaluation value is output to the control unit 114. The AF evaluation value is the value representing the sharpness (degree of contrast) of the image generated based on the output signal from the imaging element 106. Since the sharpness of the image in focus is high and the sharpness of the image out of focus is low, the AF evaluation value can be used as the value representing the focus state of the imaging optical system.

The control unit 114 is, for example, a microcomputer, and controls the operation of the entire digital video camera 100 by controlling each unit of the digital video camera 100 through the execution of a control program stored in a ROM in advance, which is not illustrated. The control unit 114 performs an AF control process in the TV-AF method (hereinafter simply referred to as "TV-AF") by controlling the focusing lens driving unit 111 based on the AF evaluation value given from the AF signal processing circuit 113.

A face detection unit 116 detects a face region as an example of a region of a person within an image by applying a face detection process based on a known face detection technique to the signal output from the CDS/AGC circuit 107. The known face detection technique includes a technique based on learning using neural network and a technique for searching images for a portion with a characteristic shape such as eyes, a nose, or a mouth using template matching and recognizing the portion as a face if the similarity is high. Additionally, a technique for detecting the image characteristic amounts such as the color of skin and the shape of an eye and analyzing those statistically or many other techniques have been suggested. In general, plural of these techniques are combined to improve the face detection accuracy. As a specific example, Japanese Patent Application Laid-Open No. 2002-251380 has disclosed a method of detecting a face by using the wavelet transformation and the image characteristic amount. Although the face detection process by the face detection unit 116 is repeated for every plural frames, the process may be conducted for every frame.

The face detection unit 116 outputs to the control unit 114, the information that can identify the position and the size of each region detected as the human face (face region) within the image and the reliability of the detection result, etc. as the face detection result. Based on the face detection result, the control unit 114 instructs the AF gate 112 to set the focal point detection region including the face region within the image.

A human body detection unit 119 detects a human body region in the image by performing a known human body detection process on the signal output from the CDS/AGC circuit 107. The human body detection unit 119 outputs to the control unit 114, the information that can identify the position and the size of each region detected as the human body (human body region) within the image and the reliability of the detection result, etc. as the human body detection result. Based on the human body detection result, the control unit 114 estimates the face region in this embodiment. In a method of estimating the face region from the human body detection result, for example, in the case of detecting the shape of an upper half body or the shape of a human body above the chest (region including face and body) as the human body region, the head region is determined based on the shape of the human body region. Since the relation of the size or position between the head region and the face region can be obtained statistically in advance, the determination of the head region can estimate the position or the size of the face region. The control unit 114 decides the final face region in accordance with the human body detection result and the face detection result. The face region detected by the human body detection hereinafter refers to the face region estimated based on the human body detection result. The detection process by the human body detection unit 119 is repeated for every plural frames; however, the process may be conducted for every frame.

As a method for detecting the human body region by the human body detection unit 119, for example, the method disclosed in Japanese Patent Application Laid-Open No. 2009-211311 can be employed. Specifically, a Sobel filter, a Prewitt filter, a Haar filter or the like is used to detect the local edge intensity of the contour of the upper half body as the local characteristic amount, and whether each human region is the upper half body or not is determined based on the extracted local characteristic amount. This determination can be made based on the mechanical learning such as AdaBoost. Since the image photographed by a security camera is the target in Japanese Patent Application Laid-Open No. 2009-211311, the image photographed obliquely from above is used; however, the human body region detection from the contour is not limited to the image photographed obliquely from above.

As described above, in this embodiment, the partial region corresponding to the detection region obtained by the face detection unit 116 is estimated from the detection result obtained by the human body detection unit 119. This estimation method is to estimate the region through the linear transformation on the basis of the relation of the detection region between the face detection unit 116 and the human body detection unit 119. Therefore, it is preferable that the human body detection unit 119 detects the human body in the range covering the range where the face detection unit 116 detects the face so that the face position of a person can be estimated from the detected human body region.

In order to provide the information of the subject region detected by the face detection or the human body detection to the photographer, the control unit 114 overlays the subject region frame on the image displayed on the display unit 109, for example, through the camera signal processing circuit 108. Thus, the subject region frame is overlaid on the image, so that the photographer can know the subject region detected by the digital video camera 100.

The relation between the face detection unit 116 and the human body detection unit 119 is described mainly as the relation between the face and the human body; however, for example, embodiments of the present invention can be applied to a subject other than a human. For example, the human body detection unit 119 may be a unit configured to detect the region including the region to be detected by the face detection unit 116 or the region that can identify or estimate the position of the region to be detected by the face detection unit 116. Specifically, a detection unit corresponding to the human body detection unit 119 detects a region of a vessel for beverage and a detection unit corresponding to the face detection unit 116 detects a region of a lid part of the vessel to be detected. Moreover, in regard to the relation between the face detection unit 116 and the human body detection unit 119, the human body detection unit 119 is more likely to output the detection result than the face detection unit 116.

The control unit 114 controls to display on the display unit 109 the face frame indicating the position of the face region acquired by the face detection unit 116 or the face region estimated from the human body region acquired by the human body detection unit 119. Based on the information of the face frame transmitted from the control unit 114, an image with the face frame overlaid thereon in the camera signal processing circuit 108 is generated and displayed on the display unit 109. The size of the face frame may be changed based on the size of the face region to be the target. The position of the face region may be displayed in any shape without being limited to the shape of the frame. In order to prevent users from feeling strangeness, the display mode is desirably the same between the face frame based on the face region acquired by the face detection unit 116 and the face frame based on the face region estimated from the human body region.

Based on the information on the face region acquired by the face detection unit 116 and the face region estimated from the human body region acquired by the human body detection unit 119, the control unit 114 sets the evaluation frame (evaluation region) for acquiring the evaluation value that is used in the AF control or the AE control. Based on the signal output from the region on the imaging element 106 corresponding to the evaluation frame, the AF evaluation value or the luminance information to be described below is acquired.

A diaphragm driving unit 117 includes an actuator for driving the diaphragm 103 and a driver for the same. A luminance information detection/calculation circuit 118 acquires the photometric value and calculates and normalizes the value for acquiring the luminance value of the photometric frame in the screen from the signals read out by the CDS/AGC circuit 107. The control unit 114 calculates the difference between the photometric value and the target value set to provide the appropriate exposure. After that, the control unit 114 calculates the correction driving amount for the diaphragm based on the calculated difference, thereby controlling the driving of the diaphragm driving unit 117.

In regard to the detection result of the face detection unit 116 and the detection result of the human body detection unit 119, the control unit 114 determines the detection result for the same subject by means of, for example, calculating the correlation of the position and the size. On this occasion, the control unit 114 estimates the position and the size of the face from the human body detection result received from the human body detection unit 119. Then, the control unit 114 integrates the detection results that have been determined to be obtained from the same subject, and outputs the information of the subject region to the AF gate 112. The AF gate 112 supplies to the AF signal processing circuit 113 only the signals corresponding to the subject region received from the control unit 114.

An operation unit 121 is an input device group for enabling a user to input various instructions and settings to the digital video camera 100. The operation unit 121 includes a general input device such as a button, a switch, or a touch panel. The control unit 114 executes various operations in accordance with the user instruction input through the operation unit 121.

DESCRIPTION OF THE EMBODIMENTS

Figure 2A:
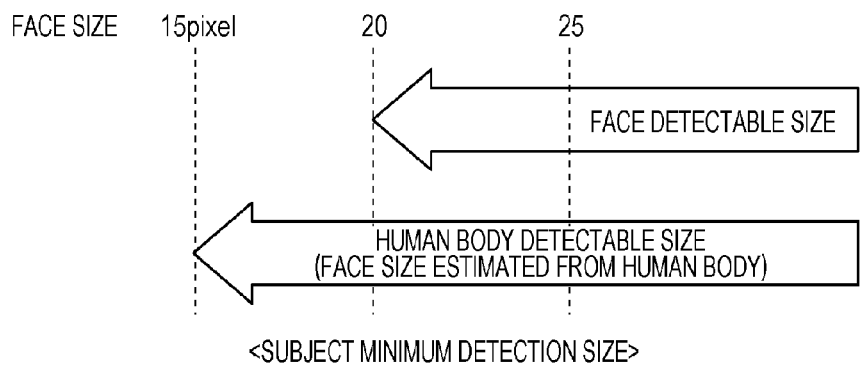
FIGS. 2A to 2C are diagrams for describing the effective size in the subject detection according to an exemplary embodiment.

Prior to the detailed description, the outline of this embodiment is described with reference to FIGS. 2A to 2C. FIG. 2A illustrates the minimum face size that can be detected by the face detection and the human body detection in this system. In this drawing, the subject with a face size of 20 pixels at the minimum can be detected in the face detection of this system. Moreover, in the face detection based on the human body detection of this system, the subject with an estimated face size of 15 pixels at the minimum can be detected. In other words, in this system, the minimum detectable face size estimated from the human body detection is smaller than the minimum detectable size of the face detection. This is because when the human body region in the human body detection and the face region in the face detection are compared, the human body region is larger than the face region and moreover because the detection algorithm for the human body detection is different from that for the face detection. The above value is an arbitrary value used in the description of this embodiment, and the application of embodiments of the present invention is not limited to this numeral.

In the case of detecting a face of about 20 pixels, which is the minimum detectable size, the setting of the face frame display and the evaluation frame becomes unstable. For example, when the state has changed from the state where the face of 20 pixels is detected to the state where the face has a size of 19 pixels, the face detection is no longer possible. Therefore, when the face size is changed repeatedly between 19 pixels and 20 pixels, the display and the non-display of the face frame are frequently switched. Since the AF control and the AE control are conducted based on the evaluation frame corresponding to the detected face, the control target frequently changes depending on the presence or absence of the detected face.

Figure 2B:
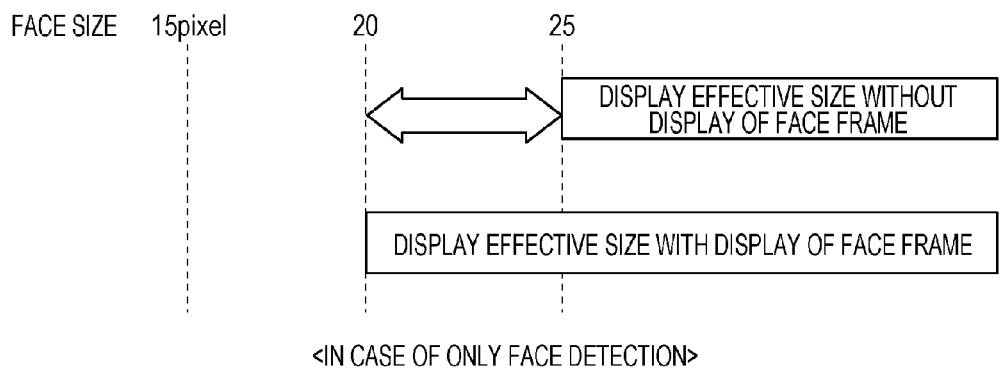
Figure 2C:
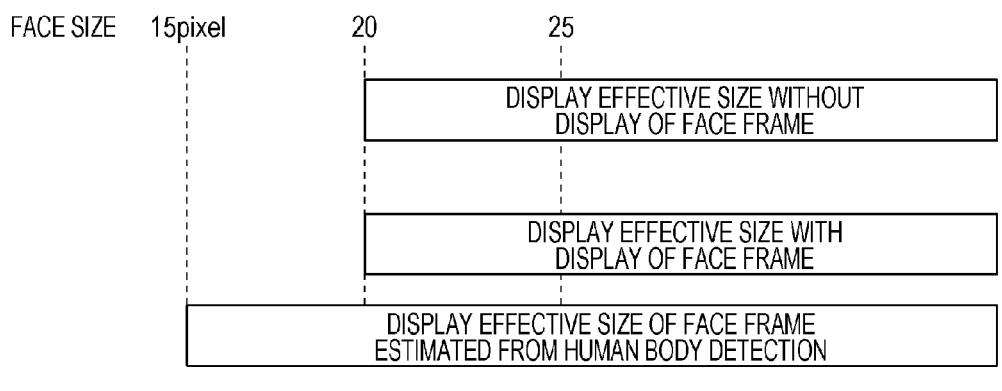

Description is made of the setting of the display effective size in consideration of the above circumstances with reference to FIGS. 2B and 2C. In this system, the concept of the display effective size is introduced as the condition of displaying the face frame. When the condition is satisfied in which the detected face has a size within the range of a predetermined display effective size (predetermined range from the maximum value to the minimum value), the face frame is displayed.

FIG. 2B is a diagram for describing the setting of the display effective size for the face frame display in the presence of the face detection result and the absence of the human body detection result. As illustrated in FIG. 2B, the display effective size is changed depending on whether the face frame based on the stored detection result, which is the previous detection result, for the same face (corresponding face) as the face region detected in the current face detection is displayed or not. The face frame based on the previous detection result refers to the face frame displayed based on the face region detected by at least one of the previous face detection and human body detection. As a method for determining whether the face region detected in the current face detection corresponds to the same face as the previous face frame, a method of comparing the position or size of the both, a method of using an authentication function, or the like can be used.

If the face obtained by the current face detection does not correspond to the face corresponding to the previous face frame, the minimum value (lower limit) of the display effective size is set to 25 pixels, which is larger than the minimum face detectable size. On the other hand, if the face obtained by the current face detection corresponds to the previous face frame, the minimum value of the display effective size is set to 20 pixels, which is the same as the minimum face detectable size. In other words, if the face obtained by the current face detection corresponds to the previous face frame, the threshold criteria of the face frame display is reduced by setting the minimum value for the display effective size to be smaller than that in the case where the face does not correspond to the previous face frame.

By changing the minimum display effective size based on the previous detection result in this manner, the flicker of the face frame display can be suppressed in FIG. 2B. For example, for displaying the face frame from the state that the face frame is not displayed, the face of 25 pixels or more (threshold or more) needs to be detected by the face detection. When the face of 25 pixels or more is detected and the face frame is displayed, the minimum display effective size is changed to 20 pixels. Therefore, even though the size of the face detected in the next face detection becomes a little smaller, the display of the face frame is continued as long as the size is 20 pixels or more. By changing the minimum display effective size depending on whether the face frame corresponding to the detected face is displayed or not, it is possible to suppress the frequent switch between the display and the non-display of the face frame.

On the other hand, when the minimum display effective size is changed as illustrated in FIG. 2B, if the face of less than 25 pixels is detected by the face detection in the initial state (before the display of the face frame), the face frame is not displayed though the face is detected.

In view of this, as long as the corresponding human body detection result is obtained in addition to the face detection result, the face frame is displayed even though the face of less than 25 pixels is detected in the initial state. FIG. 2C illustrates the display effective size in the presence of the corresponding human body detection result in addition to the face detection result. In FIG. 2C, the minimum display effective size of the face frame based on the face detection is set to 20 pixels, which is similar to the minimum face detectable size, not depending on whether the face frame is displayed or not. Since the minimum face size that can be estimated from the human body detection result is 15 pixels as aforementioned, the face of approximately 20 pixels can be estimated from the human body detection result. In this manner, in the case where the human body detection result is obtained in addition to the face detection result in the initial state, the threshold criteria of the face frame display is reduced as compared to the case where the human body detection result is not obtained.

When the subject has a face size of 19 pixels, the face detection is not possible but the face region can be estimated as long as the human body detection result is available. Since the accuracy of the human body detection is lower than that of the face detection in this system, the accuracy of the face frame may be low if the face frame is displayed based on only the human body detection result. On the other hand, if the face region estimated from the human body detection result corresponds to the face frame displayed based on the previous detection result, it is supposed that the estimated face region has high reliability. In view of this, in this embodiment, if the face frame based on the previous detection result is displayed in regard to the same face (corresponding face) as the face region estimated from the human body detection result, the face frame based on the currently estimated face region is displayed. The face frame based on the previous detection result refers to the face frame displayed based on the face region detected by at least one of the previous face detection and human body detection. As a method of determining whether the face region estimated from the current human body detection result is the same face as the face region corresponding to the previous face frame, a method of comparing the position or size of the both, a method of using an authentication function, or the like is given.

As thus described, in the presence of the corresponding human body detection result in addition to the face detection result, the performance of the face frame display in the initial state can be increased by setting the display effective size not depending on the previous face frame. If the region of the face with the size at which the face cannot be detected can be estimated from the human body detection, the control is conducted so that the face frame is displayed if the face corresponds to the previous face frame. Thus, the flicker of the face fame can be suppressed even when the face size is close to the minimum face detectable size.

By changing the setting of the display effective size in the case where only the face detection is possible and both the face detection and the human body detection are possible, the flicker of the face frame can be suppressed and the display performance of the face frame can be improved. Note that since the face and the human body of a general subject are often detected at the same time, the effectiveness of this embodiment is achieved in many scenes.

Note that this embodiment has described that the minimum value of the display effective size is reduced as a means of relieving the face frame display; however, another method may be employed. The threshold criteria of the face frame display may be reduced by reducing the threshold of the reliability by, for example, displaying the face frame when the reliability of the subject is higher than the threshold.

<Flowchart of Main Control Process>

Figure 3:
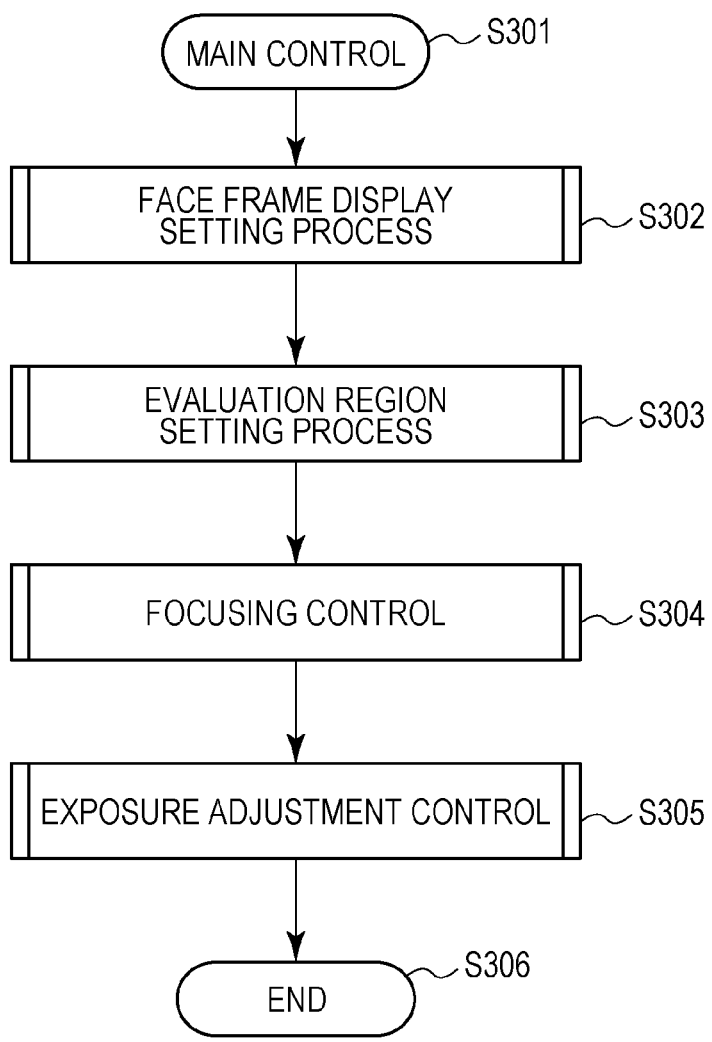
FIG. 3 is a flowchart illustrating the main control according to an exemplary embodiment.

Next, the flow of the control in this embodiment is described. FIG. 3 is a flowchart for describing the main control process in the digital video camera 100 of this embodiment. Step S301 corresponds to the start of the process.

In Step S302, the subject is detected from the photographed image in the face detection unit 116 and the human body detection unit 119, and the display setting for the face frame is carried out. The details are described below with reference to FIG. 4.

In Step S303, the control unit 114 sets the evaluation region used for the focusing control and the exposure adjustment control on the basis of the region of the detected subject.

In Step S304, the control unit 114 executes the focusing control, and moves the focusing lens so as to focus in the set focal point detection region. The details are described below with reference to FIG. 7 to FIG. 11.

In Step S305, the control unit 114 executes the exposure adjustment control, and moves the diaphragm so that the set exposure adjustment region is exposed as appropriate. The details are described below with reference to FIG. 12 and FIG. 13. Then, the process advances to Step S306, where the process ends.

<Flowchart of Face Frame Display Setting Process>

Figure 4:
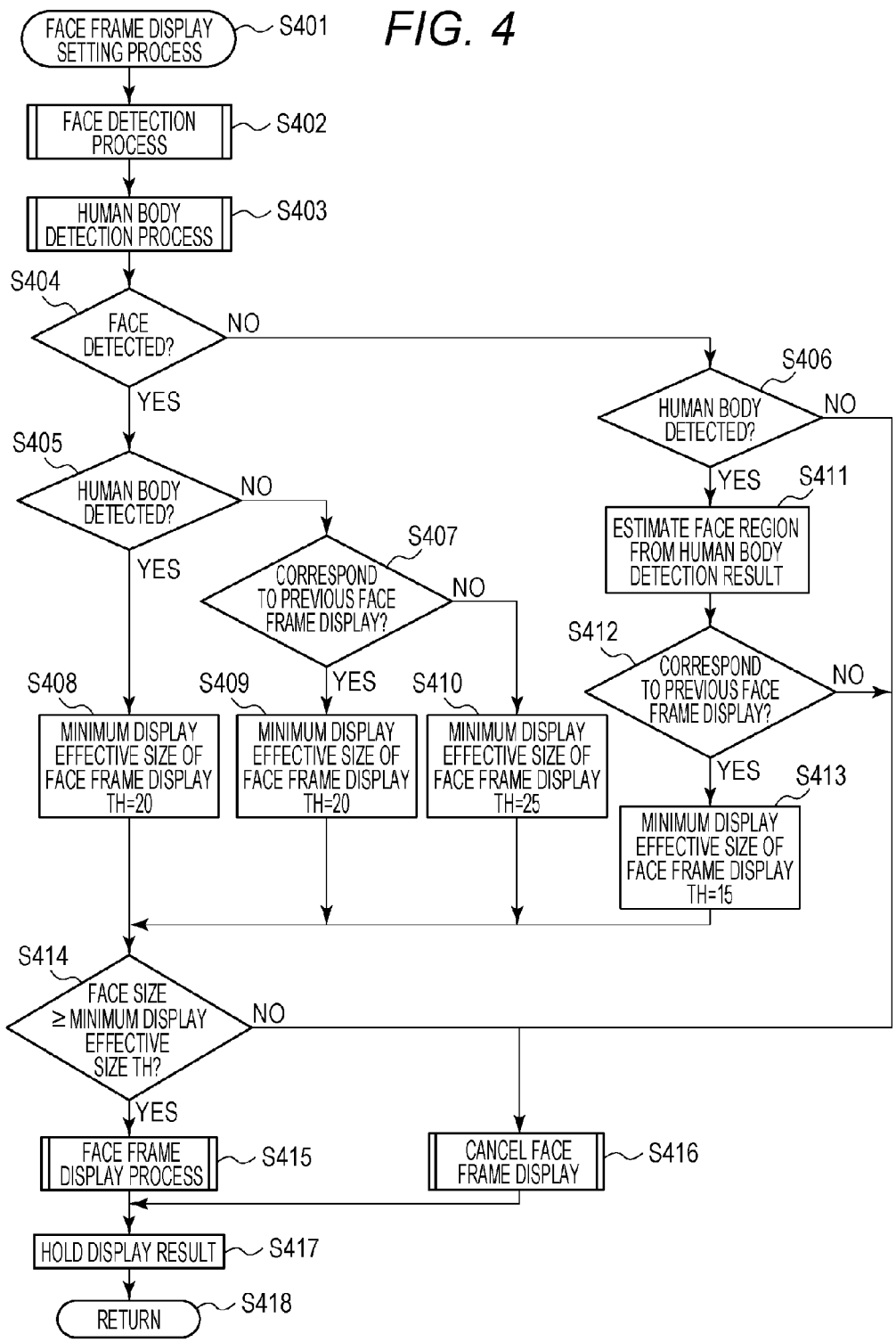
FIG. 4 is a flowchart illustrating the subject detection process according to an exemplary embodiment.

Next, description is made of the face frame display setting process in Step S302 in FIG. 3 with reference to the flowchart of FIG. 4. The present process is controlled by the control unit 114 unless otherwise stated.

First, Step S401 corresponds to the start of the process. In Step S402, the face detection unit 116 carries out the face detection process by the aforementioned method from the acquired image, and the process advances to Step S403. In Step S403, the human body detection unit 119 conducts the human body detection process by the aforementioned method from the acquired image and the process advances to Step S404.

In Step S404, the control unit 114 determines whether the face region has been detected or not by the face detection in Step S402. If the face region has been detected, the process advances to Step S405; if not, the process advances to Step S406.

Step S405 to Step S410 are the process of changing the threshold of the minimum display effective size of the aforementioned face frame display depending on the presence or absence of the human body detection result. In Step S405, the control unit 114 determines whether the human body region has been detected by the human body detection in Step S403 or not. If the human body region has been detected, the process advances to Step S408; if not, the process advances to Step S407.

In the state of Step S408, the face region and the human body region have been detected. Therefore, as described with reference to FIG. 2C, the minimum display effective size (threshold of the display effective size) for the face frame display is set to 20 pixels. Note that in this embodiment, the lower-limit value of the face detection of this system is used as the minimum display effective size in this case; however, the size is not limited to the lower-limit value and may be changed according to the subject to be photographed.

On the other hand, when the process advances to Step S407, the minimum display effective size is set as described with reference to FIG. 2B. In Step S407, the control unit 114 determines whether the face detected in the current face detection corresponds to the face in the face frame displayed based on the previous detection or not, with reference to the previous face frame display result held in Step S417, which is described below. If it has been determined that the detected face corresponds to the face in the previous face frame, the process advances to Step S410 and if not (if the previous face frame is not displayed or if the face does not correspond to the face in the previous face frame), the process advances to Step S409.

In the state of Step S410, the human body detection result is absent and the previous face frame corresponding to the current face detection result is not present. Therefore, the control unit 114 sets the minimum display effective size of the face frame display to 25 pixels. In other words, the size is set to the value larger than the lower-limit value of the face detection in this system. Note that this threshold is not limited to 25 pixels and may be set in consideration of the variation in face detection. In this embodiment, by setting the margin of about 5 pixels as a result of considering the variation in face detection, the flicker of the face frame display is reduced; therefore, the size is set to 25 pixels, which is 5 pixels larger than the lower-limit value of the face detection. Moreover, the minimum display effective size of the face frame display may be changed depending on the reliability of the face detection. Specifically, when the reliability of the face detection is low, the face detection size may vary; therefore, the minimum display effective size is changed to a larger value.

In the state of Step S409, the human body detection result is absent and the previous face frame corresponding to the current face detection result is present. Therefore, the minimum display effective size of the face frame display (threshold of the display effective size) is set to 20 pixels. In other words, the size is set to the value smaller than the minimum display effective size set in Step S410. Although the lower-limit value of the face detection of this system is used as the minimum display effective size in this case of this embodiment, the size is not limited to the lower-limit value and may be set in accordance with the subject to be photographed or the like.

As described above, the minimum display effective size of the face frame is set depending on the presence or absence of the human body detection in Steps S405 to S410. After the minimum display effective size is set in Step S409 or S410, the process advances to Step S414.

On the other hand, Step S406 and Steps S411 to S413 are the processes for, if the face detection has failed, displaying the face frame using the face region estimated based on the human body detection result. In Step S406, the control unit 114 determines whether the human body region has been detected by the human body detection of Step S403 or not. If the human body region has been detected, the process advances to Step S411; if not, the process advances to Step S416.

In Step S411, the human body detection unit 119 estimates the face region by the aforementioned method from the detected human body region, and the process advances to Step S412. In Step S412, the control unit 114 refers to the previous face frame display result that is held and stored in Step S417. Then, whether the face currently estimated in Step S411 corresponds to the face in the face frame displayed based on the previous detection or not is determined. If it has been determined that the face corresponds to the face in the previous face frame, the process advances to Step S413; if not (if the previous face frame is not displayed or if the face does not correspond to the face in the previous face frame), the process advances to Step S416.

In Step S413, the control unit 114 sets the minimum display effective size of the face frame display to 15 pixels as described with reference to FIG. 2C. Note that the lower-limit value of the face region that can be estimated based on the human body detection in this system is used as this threshold. However, the minimum display effective size in this case is not limited to the above lower-limit value and may be changed in accordance with the subject to be photographed or the like.

After the completion of the process in Step S413, the control unit 114 determines whether the size of the face region estimated from the human body detection result is more than or equal to the minimum display effective size or not in Step S414. If the size is more than or equal to the minimum display effective size, the process advances to Step S415; if not, the process advances to Step S416.

In Step S415, since there is the face frame to be displayed, the control unit 114 transmits the data on the face size and the face position to the display unit and displays the face frame. After this process, the process advances to Step S417.

In Step S416, since there is no face frame to be displayed, the control unit 114 does not display the face frame and if there is the displayed face frame, the control unit 114 cancels the display. After this process, the process advances to Step S417.

In Step S417, the control unit 114 holds the face frame display result of Step S415 or S416. As the face frame display result, the information of the presence or absence of the face frame display, and if the face frame display is present, the position or size of the face frame are held and stored. Since the result of the face frame display is used in the next process, the result is held and stored until at least the next process. After the process, the process advances to Step S418 where the subject detection process ends.

Flowchart of Evaluation Region Setting Process

Figure 5:
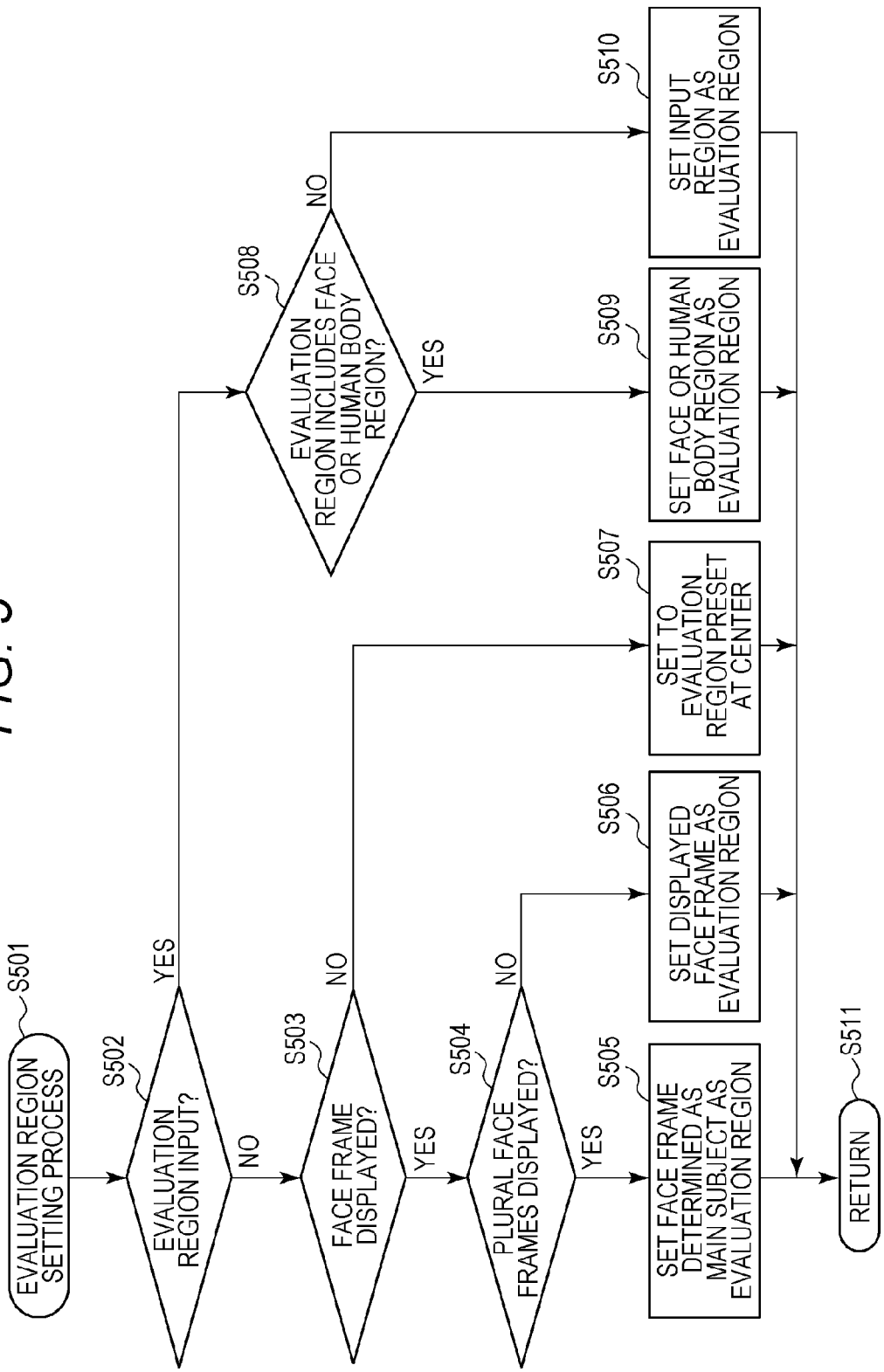
FIG. 5 is a flowchart illustrating the evaluation frame setting according to an exemplary embodiment.

Next, an evaluation region setting process in Step S303 of FIG. 3 is described in detail with reference to the flowchart of FIG. 5. Step S501 corresponds to the start of the process.

In Step S502, the control unit 114 determines whether the user has specified the region (evaluation region) where the AF control and the AE control is conducted. If the user has specified the evaluation region through the operation unit 121, the control unit 114 advances the process to S508; if not, the control unit 114 advances the process to S503. There is no particular limitation on the method of specifying the evaluation region by the user, and the user generally specifies the region directly on the display unit 109 displaying the live view image through the touch panel or select the region using the direction key, for example. Other methods are also applicable.

In Step S503, the control unit 114 determines whether the face frame display is conducted or not by the process in Step S302 in FIG. 3. If the displayed face frame exists, the process advances to Step S504; if not, the process advances to Step S507.

In Step S504, the control unit 114 determines whether the number of displayed face frames is plural or not. If the number is plural, the process advances to Step S505; if the number is just one, the process advances to Step S506.

In Step S505, the control unit 114 decides the face frame to be the main subject from among the plural displayed face frames, and sets the evaluation region for the face frame decided as the main subject. As a method of deciding the main subject, for example, a method of giving higher points to the subject as the position of the face region (such as the center of the circumscribing rectangle or the center of gravity) is closer to the center of the screen or the size thereof is larger, and deciding the face region corresponding to the face frame with the highest point as the main subject. Note that the evaluation region is set based on the face frame; however, it is not necessary to set the evaluation region to be the same as the face frame and the evaluation region may be different in size, shape, or position of center of gravity.

Figure 6:
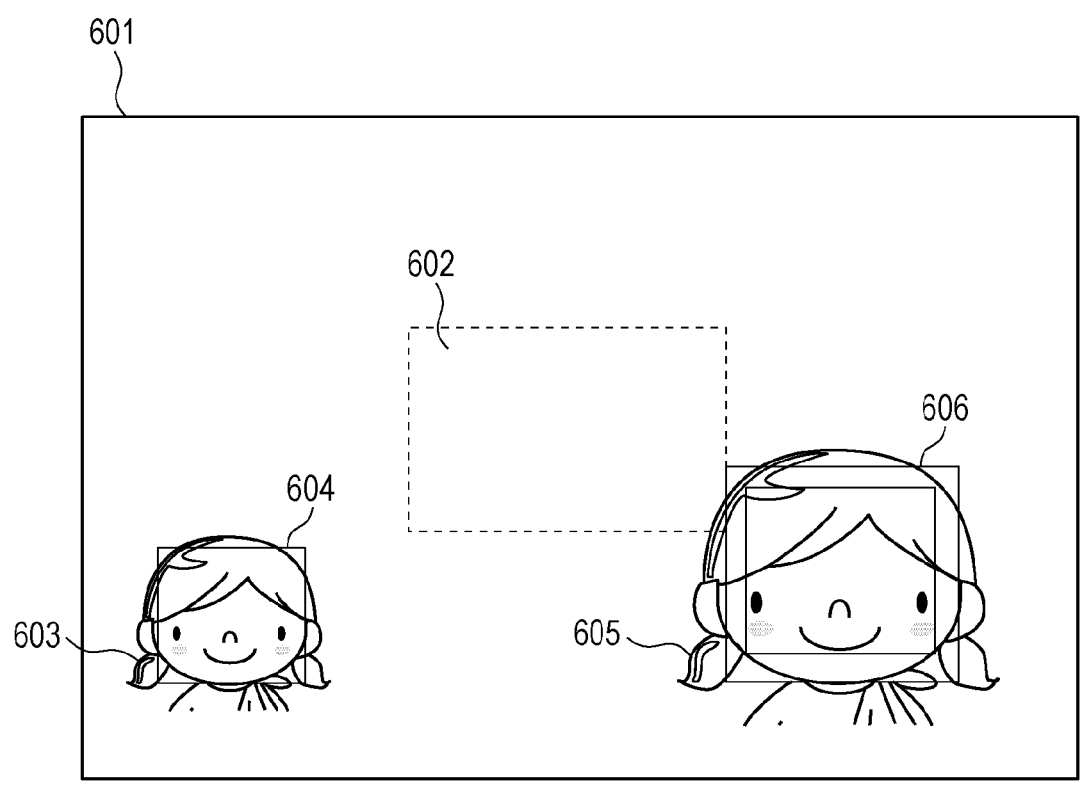
FIG. 6 is a diagram illustrating a display example of the subject detection result according to an exemplary embodiment.

FIG. 6 illustrates an example of the face frame display. In FIG. 6, a subject 603 and a subject 605 are detected, and a face frame 604 and a face frame 606 are displayed, respectively. Out of the two subjects, the subject 605 having the higher point is set as the main subject. In FIG. 6, the main subject is indicated by double face frames; however, another method may be employed in which, for example, the color of the face frame is changed. Note that the shape and the number of face frames are not limited.

When the number of displayed face frames is one, the control unit 114 determines that the face region corresponding to the displayed face frame is the main subject and sets the evaluation region for this face region in Step S506.

On the other hand, when the face frame is not displayed, the control unit 114 sets the evaluation region of the preset position and size in Step S507. For example, a rectangular region is set in the center as indicated by a frame 602 in FIG. 6; the shape and the number thereof are not limited in particular. In this case, the instruction by a user as described in Step S502 may be induced on the display.

If the evaluation region is input in Step S502, the control unit 114 determines in Step S508 whether the evaluation region specified includes the face region detected in Step S401 or the human body region detected in Step S402 or not. When the face region or the human body region is included, the process advances to Step S509 and the evaluation region is set based on the included face region or human body region. When the evaluation region is set based on the human body region, the evaluation region may be set based on the face region estimated from the human body region.

On the other hand, if the specified evaluation region includes neither the face region nor the human body region, the control unit 114 advances the process to Step S510 and maintains the specified evaluation region as it is.

<Flowchart of Focusing Control (AF Control)>

Next, the details of the focusing control (AF control) carried out in Step S304 in FIG. 3 by the control unit 114 are described with reference to the flowchart of FIG. 7. Step S701 corresponds to the start of the process.

The control unit 114 conducts the minute driving operation in Step S702. The minute driving operation refers to the operation for acquiring the AF evaluation value by driving the focusing lens within the minute range around the current position for determining the focusing or determining the in-focus direction. In general, the driving range of the focusing lens in the minute driving operation is narrower than that in the hill-climbing driving operation. The details of the minute driving operation are described below with reference to FIG. 8.

In Step S703, the control unit 114 branches the process depending on the determination result in Step S702. If the focusing has been determined by the minute driving operation in Step S702, the control unit 114 advances the process to Step S709; if not, the control unit 114 advances the process to Step S704.

In Step S704, the control unit 114 further branches the process depending on whether the in-focus direction has been determined in the minute driving operation in Step S702. In other words, if the focusing direction has been determined, the process advances to Step S705; if not, the process is returned to Step S702 to continue the minute driving operation.

In Step S705, the control unit 114 controls the focusing lens driving unit 111 and climb-drives the focusing lens at high speed in a direction where the AF evaluation value increases. The details of the hill-climbing driving operation are described below with reference to FIG. 10.

In Step S706, the control unit 114 determines whether the AF evaluation value has exceeded the peak thereof in the hill-climbing driving operation in Step S705 or not. If the AF evaluation value has been determined to exceed the peak, the process advances to Step S707; if not, the hill-climbing driving operation in Step S705 is continued.

In Step S707, the control unit 114 controls the focusing lens driving unit 111 to return the focusing lens 105 to the lens position where the AF evaluation value is at the peak, which is obtained in the hill-climbing driving operation. In Step S708, the control unit 114 determines whether the focusing lens 105 has returned to the position where the AF evaluation value is at the peak or not. If the focusing lens 105 has returned to the position, the process returns to Step S702 and the minute driving operation is continued again; if not, the process returns to Step S707 and the operation of returning the position of the focusing lens 105 is continued.

Next, the focusing operation from Step S709 is described. In Step S709, the control unit 114 holds the AF evaluation value from the AF signal processing circuit 113. In Step S710, the control unit 114 acquires the newest AF evaluation value from the AF signal processing circuit 113. In Step S711, the control unit 114 compares the AF evaluation value held in Step S709 with the AF evaluation value newly acquired in Step S710, and determines whether the variation in AF evaluation value is large or not. Specifically, the control unit 114 determines that the variation is large if there is a difference of more than or equal to a predetermined value in the AF evaluation value, in which case the process is returned to Step S702 and the minute driving operation is restarted. On the other hand, if the variation in AF evaluation value is not determined to be large, the process advances to Step S712 and the control unit 114 controls the focusing lens driving unit 111 to stop the focusing lens 105, and returns the process to Step S710.

<Flowchart of Minute Driving Operation>

Figure 7:
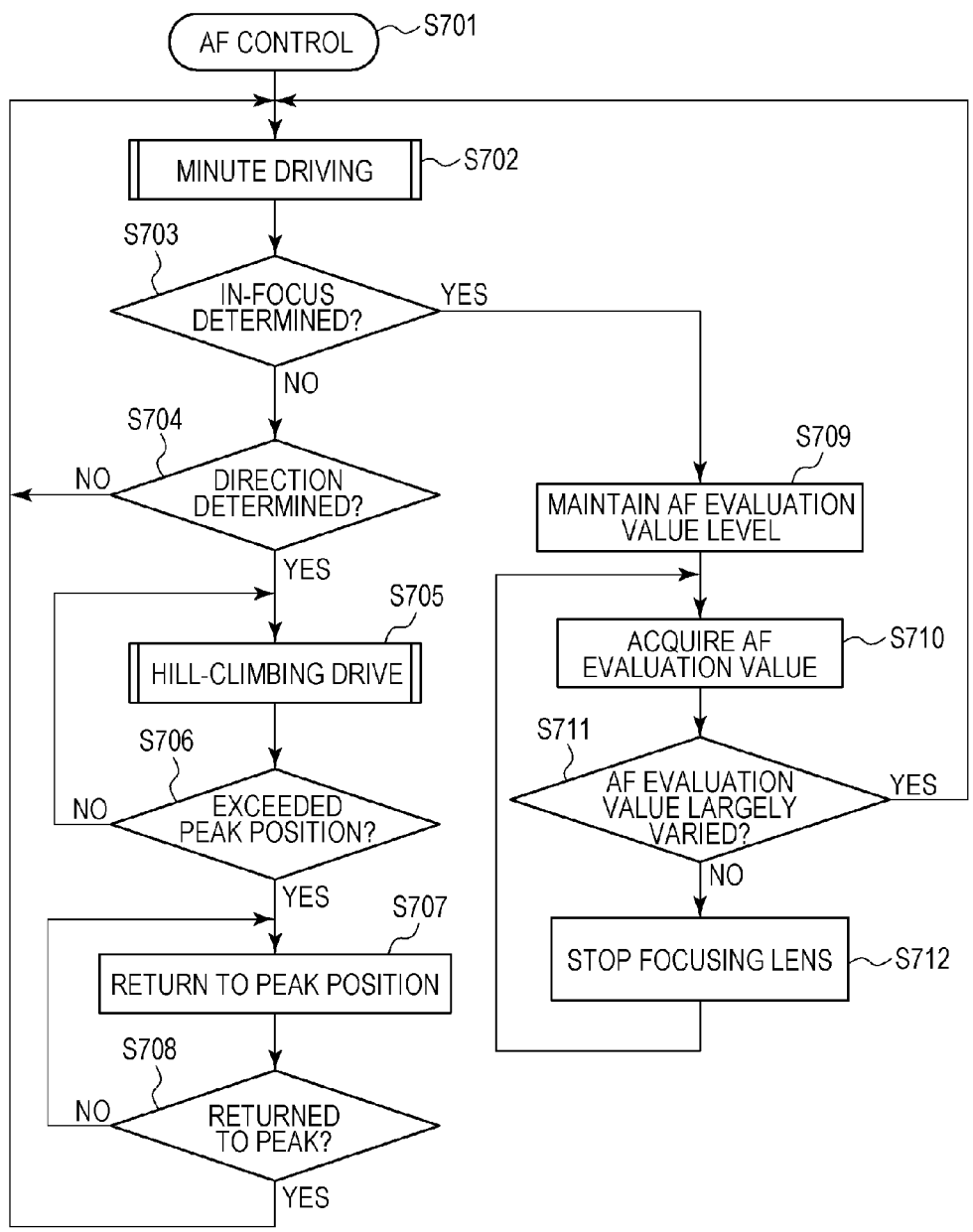
FIG. 7 is a flowchart for describing the AF control operation of the video camera according to an exemplary embodiment.
Figure 8:
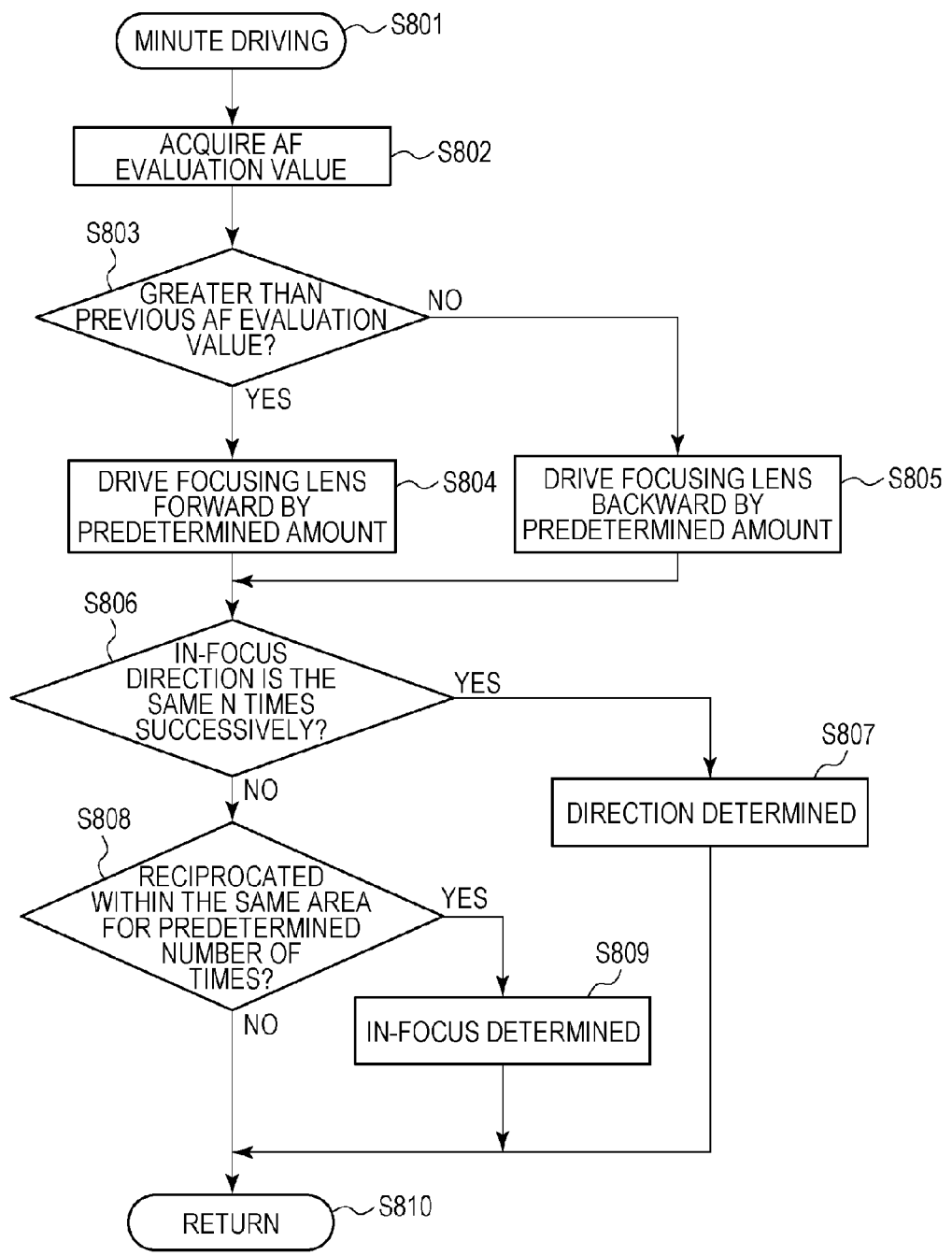
FIG. 8 is a flowchart illustrating the process of a minute driving operation according to an exemplary embodiment.

Next, description is made of the minute driving operation in Step S702 in FIG. 7 with reference to the flowchart of FIG. 8. Step S801 corresponds to the start of the process.

In Step S802, the control unit 114 sets the AF gate 112 so that only the pixel signals in the evaluation region (focal point detection region) set in Step S303 in FIG. 3 are supplied to the AF signal processing circuit 113. The control unit 114 acquires the AF evaluation value that the AF signal processing circuit 113 has generated based on the pixel signals in the AF frame.

In Step S803, the control unit 114 determines whether the AF evaluation value acquired in Step S802 is larger than the AF evaluation value acquired previously or not. If the currently acquired AF evaluation value is less than or equal to the previously acquired AF evaluation value, the control unit 114 advances the process to Step S805, where the control unit 114 controls the focusing lens driving unit 111 to move the focusing lens 105 by a predetermined amount in a direction opposite to the previous direction. On the other hand, if the currently acquired AF evaluation value is greater than the previously acquired AF evaluation value, the control unit 114 advances the process to Step S804, where the control unit 114 controls the focusing lens driving unit 111 to move the focusing lens 105 by a predetermined amount in the same direction as the previous direction.

In Step S806, the control unit 114 examines the magnitude relation of the AF evaluation values in Step S803 or whether the driving direction of the focusing lens 105 has remained the same successively for a predetermined number of times, i.e., the direction determined as the focusing direction is the same or not for a predetermined number of times (N times). If the direction determined as the focusing direction has remained the same successively for the predetermined number of times, the control unit 114 determines that the direction has been determined in Step S807 and advances the process to Step 5810, where the minute driving operation ends.

On the other hand, if the direction determined as the in-focus direction is not the same successively for the predetermined number of times, the control unit 114 determines, in Step S808, whether the position of the focusing lens 105 reciprocates for a predetermined number of times within the same range. This determination may be made as to whether the position of the focusing lens 105 is within a predetermined range for a predetermined period of time. If any condition is satisfied, the control unit 114 determines that the focusing has been determined in Step S809; then, the process advances to Step S810 to end the minute driving operation. If none of the conditions is satisfied in Step S810, neither the direction determination nor the focusing determination has done and the minute driving operation is ended.

Figure 9:
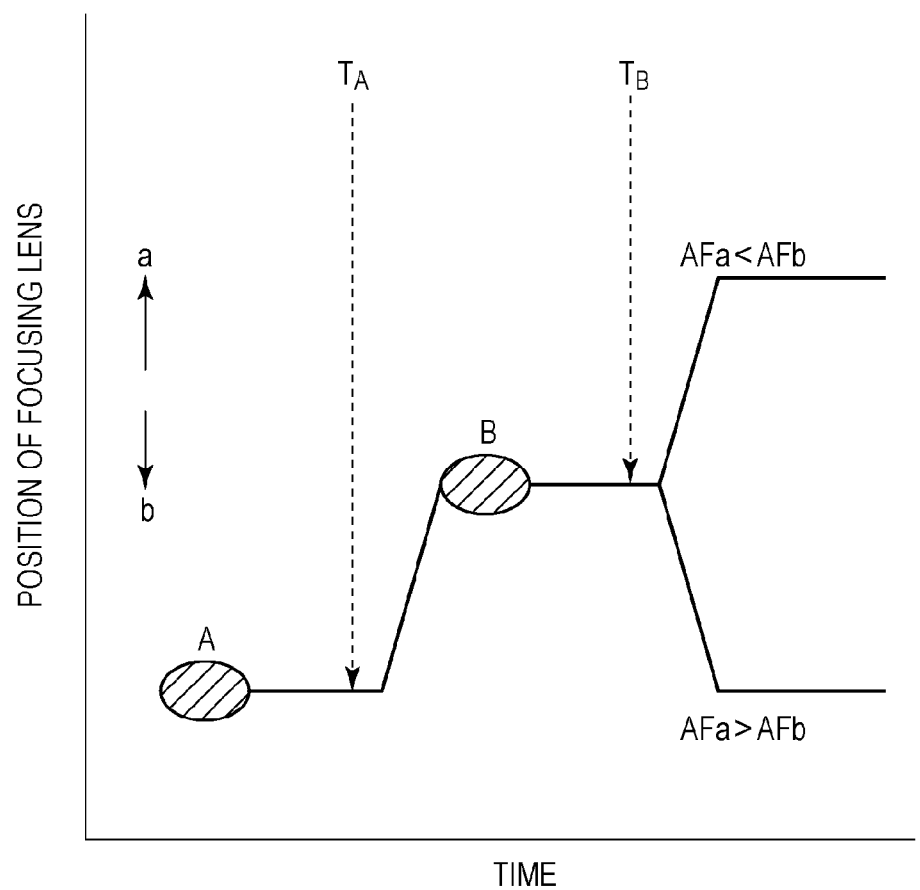
FIG. 9 is a diagram illustrating the minute driving operation according to an exemplary embodiment.

FIG. 9 is a diagram illustrating an example of the positional change of the focusing lens 105 during the minute driving operation, where the horizontal axis represents the time and the vertical axis represents the position of the focusing lens 105. In FIG. 9, the AF evaluation value is generated from the signals generated by the CDS/AGC circuit 107 based on the charges accumulated in the imaging element 106 in a period A. The AF signal processing circuit 113 generates the AF evaluation value $AF_A$ from the signals corresponding to the focal point detection region among the signals generated by the CDS/AGC circuit 107, and the AF evaluation value $AF_A$ is acquired by the control unit 114 at time $T_A$. After that, the focusing lens 105 is moved by a predetermined amount in a direction of an arrow a by the minute driving operation, and the AF evaluation value $AF_B$ generated from the electric charge signals accumulated in the imaging element 106 in a period B is acquired by the control unit 114 at time $T_B$.

Then, the control unit 114 compares the AF evaluation values $AF_A$ and $AF_B$; if $AF_A < AF_B$, the control unit 114 moves the focusing lens 105 forward (in the same direction as the previous direction, i.e., the direction of the arrow a) by a predetermined amount. On the other hand, if $AF_A > AF_B$, the control unit 114 moves the focusing lens 105 backward (in the direction opposite to the previous direction, i.e., the direction of the arrow b) by a predetermined amount.

Note that the amount of one movement of the focusing lens 105 in Steps S804 and S805 in the minute driving operation is preferably the amount of such a degree that the user cannot identify the change in the focus state when the image is displayed on the display unit 109 or the like. Specifically, the amount of movement is preferably set so that the position after the movement is in the depth of focus.

<Flowchart of Hill-Climbing Driving Operation>

Figure 10:
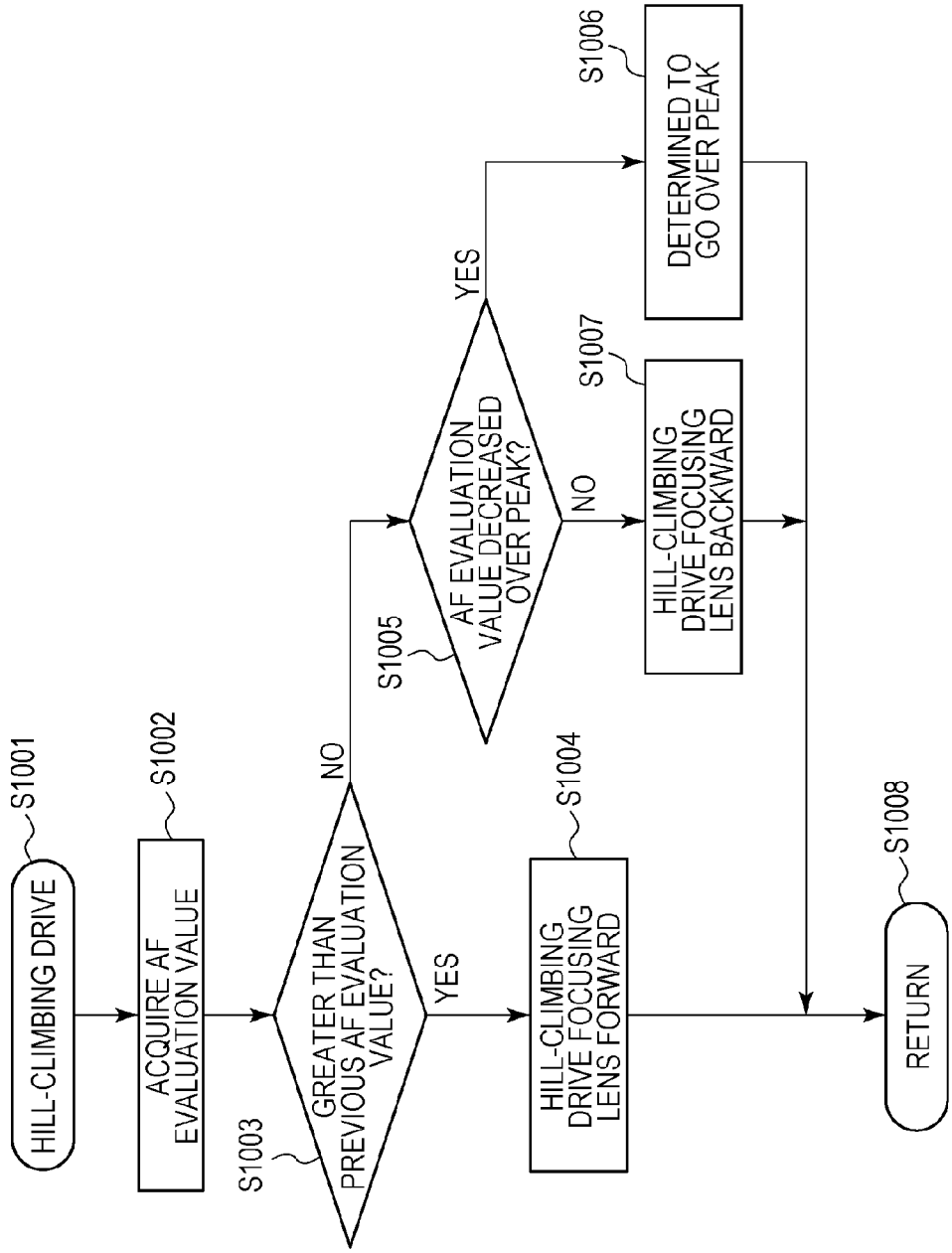
FIG. 10 is a flowchart illustrating the process of a hill-climbing operation according to an exemplary embodiment.

Next, the hill-climbing driving operation in Step S705 of FIG. 7 is described with reference to the flowchart of FIG. 10. Step S1001 corresponds to the start of the process.

In the hill-climbing driving operation, first, the control unit 114 acquires the AF evaluation value in Step S1002 in a manner similar to the minute driving operation. Next, in Step S1003, the control unit 114 compares the sizes of the previously acquired AF evaluation value and the currently acquired AF evaluation value, and then branches the process.

If the currently acquired AF evaluation value is greater than the previously acquired AF evaluation value, the process advances to Step S1004. In Step S1004, the control unit 114 controls the focusing lens driving unit 111 to move the focusing lens 105 in the same direction as the previous direction (forward) at a predetermined speed. Then, the process ends.

On the other hand, if the currently acquired AF evaluation value is less than or equal to the previously acquired AF evaluation value, the process advances to Step S1005. In Step S1005, the control unit 114 determines whether the AF evaluation value has decreased after the peak. Then, if it has been determined that the AF evaluation value decreased after the peak, the process advances to Step S1006, where the control unit 114 determines that the value has exceeded the peak; then, the process ends. If it has not been determined, in Step S1005, that the AF evaluation value decreased after the peak, the process advances to Step S1007. In Step S1007, the control unit 114 controls the focusing lens driving unit 111 to move the focusing lens 105 at a predetermined speed in a direction opposite to the previous direction; then, the process ends.

Figure 11:
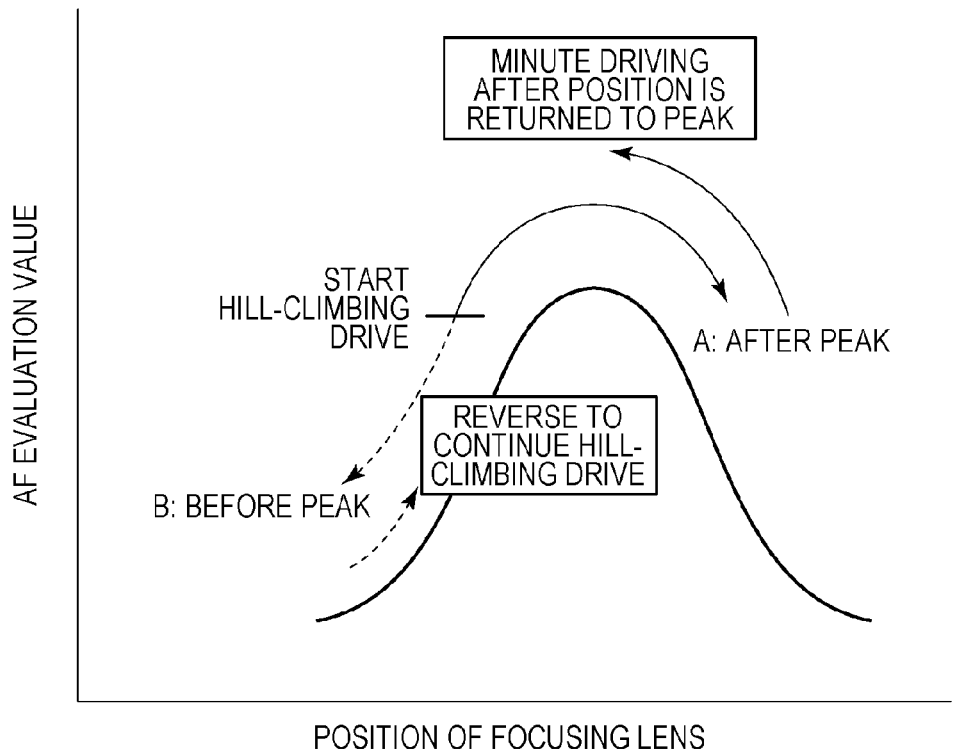
FIG. 11 is a diagram illustrating the hill-climbing operation according to an exemplary embodiment.

FIG. 11 is a diagram illustrating an example of a size of the AF evaluation value and the driving operation of the focusing lens 105 during the hill-climbing driving operation. In FIG. 11, when the focusing lens 105 is driven to the right in the drawing from the position where the hill-climbing driving starts, the decrease in AF evaluation value after the peak is detected as indicated by the arrow A. In this case, it is determined that the position has exceeded the focal point and therefore the hill-climbing driving operation is ended; then, the focusing lens 105 is returned to the position where the peak of the AF evaluation value is obtained (Steps S707 and S708 in FIG. 7) and the process transits to the minute driving operation (Step S702).

On the other hand, when the focusing lens 105 is driven to the left in the drawing from the position where the hill-climbing driving starts, the decrease in AF evaluation value before the peak is detected as indicated by the arrow B. In this case, it is determined that the focusing lens 105 has been moved in the wrong direction and therefore the hill-climbing driving operation in the opposite direction is continued. Note that the amount of movement per certain period of time of the focusing lens 105 is larger than that in the aforementioned minute driving operation.

In this manner, the control unit 114 performs the AF control operation for moving the focusing lens 105 to the position where the AF evaluation value is at the peak while repeating the steps of: determination as to the necessity of restart (starting over from the minute driving)→minute driving→hill-climbing driving→determination for the restart.

<Flowchart of Exposure Adjustment Control>

Figure 12:
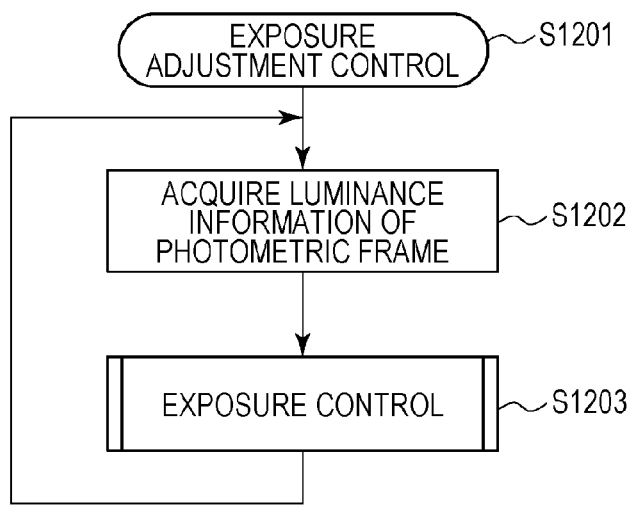
FIG. 12 is a flowchart for describing the AE control operation according to an exemplary embodiment.

Next, the outline of the exposure adjustment (AE) control executed by the control unit 114 is described. FIG. 12 is a flowchart of the exposure adjustment control in this embodiment. Step S1201 corresponds to the start of the process.

First, in Step S1202, the control unit 114 acquires the luminance information as the evaluation value used in the exposure control from a luminance information detection/calculation circuit 118. The luminance information here is acquired from the evaluation region (photometric frame) whose position and size are set in Step S303 of FIG. 3.

In Step S1202, the control unit 114 performs the luminance adjustment by the exposure control; then, the process returns to Step S1202 and this process is repeated.

Next, description is made of the exposure control in Step S1202. The luminance signal output from the CDS/AGC circuit 107 is taken into the control unit 114 through the luminance information detection/calculation circuit 118. The control unit 114 controls the diaphragm driving unit 117 so that the output level of the luminance information detection/calculation circuit 118 is in a predetermined range. The diaphragm driving control system controls the driving current to control the exposure through the diaphragm control that changes the open area amount of the diaphragm 103. In a manner similar to the exposure control by the diaphragm 103, the control unit 114 controls the level of the gain of the CDS/AGC circuit 107 so that the output level of the luminance information detection/calculation circuit 118 taken in the control unit 114 is in a predetermined range. With the closed-loop control as above, the exposure control system is configured.

Subsequently, description is made of the exposure control according to the brightness with reference to FIG. 13. In FIG. 13, the horizontal axis represents the illuminance of the subject and the vertical axis represents the setting values of the exposure control units for the diaphragm and the gain. As is clear from the drawing, each exposure control unit is divided into two regions of A and B in accordance with the illuminance of the subject. In other words, the exposure operation control is conducted by combining two kinds of exposure control units in accordance with the illuminance of the subject. In the region A, the gain of the AGC circuit is fixed at 0 dB, and the exposure is controlled just by the open area amount of the diaphragm. In the region B, the diaphragm is fixed to be open and the exposure is controlled just by the AGC circuit. In this embodiment, the diaphragm member and the AGC circuit are used for the exposure control; alternatively, the exposure control with higher accuracy may be performed by the use of the exposure control system additionally including an ND or a shutter speed.

In this embodiment, the control unit 114 has two kinds of control systems of the exposure control system by the diaphragm driving and the exposure control system by the AGC circuit, and repeatedly conducts the exposure control so that the taken output level of the luminance information detection/calculation circuit 118 is within the predetermined range.

As described above, in this embodiment, the face frame can be stably displayed by setting the effective size for the face frame display in accordance with the detection circumstances of the face detection and the human body detection. Moreover, the stable AF control or AE control becomes possible by setting the evaluation region for acquiring the evaluation value used in the AF control or the AE control based on the above face frame.

OTHER EMBODIMENTS

Embodiments of the present invention can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and function.

This application claims the benefit of Japanese Patent Application No. 2013-128286, filed Jun. 19, 2013, which is hereby incorporated by reference herein in its entirety.

What is claimed is:

1. A subject detection device comprising:
    a first detection unit configured to detect a region of a first detection target from an image;

a second detection unit configured to detect from the image, a region of a second detection target from which the region of the first detection target can be estimated; and a control unit configured to control to display in a predetermined mode indicating the region of the first detection target if a predetermined condition is satisfied, wherein when the first detection unit detects the region of the first detection target and the second detection unit detects the region of the second detection target when the control unit controls to not display in the predetermined mode, the control unit reduces the predetermined condition as compared with when the region of the second detection target is not detected.

2. The subject detection device according to claim 1, wherein if a size of the region detected by the first detection unit is within a predetermined range, the control unit controls to display in the predetermined mode and changes setting of the predetermined range to thereby change the predetermined condition.

3. The subject detection device according to claim 1, wherein the control unit changes the predetermined condition based on stored detection results of the first detection unit and the second detection unit.

4. The subject detection device according to claim 1, wherein when the first detection unit detects the region of the first detection target and the second detection unit does not detect the region of the second detection target and it has been determined that the region of the first detection target detected by the first detection unit corresponds to the display in the predetermined mode, the control unit reduces the predetermined condition as compared with when it has been determined that the region of the first detection target detected by the first detection unit does not correspond to the display in the predetermined mode.

5. The subject detection device according to claim 1, wherein if a size of the region of the first detection target detected by the first detection unit is more than or equal to a first threshold, the control unit controls to display in the predetermined mode and changes the predetermined condition by changing the first threshold to a second threshold.

6. The subject detection device according to claim 5, wherein when the first detection unit detects the region of the first detection target and the second detection unit detects the region of the second detection target, the second threshold is set to a value based on the size of the first detection target detected by the first detection unit.

7. The subject detection device according to claim 1, wherein the predetermined condition is changed according to reliability of a detection result of the first detection unit.

8. The subject detection device according to claim 1, wherein when the first detection unit does not detect the region of the first detection target and the second detection unit detects the region of the second detection target, the control unit controls to display in the predetermined mode based on the detection result of the second detection unit and the stored detection result of the first detection unit.

9. The subject detection device according to claim 8, wherein when the region of the second detection target detected by the second detection unit corresponds to the stored detection result of the first detection unit, the control unit controls to display in the predetermined mode based on the region of the first detection target estimated from the region of the second detection target.

10. The subject detection device according to claim 9, wherein the control unit controls to display in the predetermined mode when a size of the region of the first detection target estimated from the region of the second detection target is more than or equal to a third threshold.

11. The subject detection device according to claim 10, wherein the third threshold is set based on a lower-limit value of the size of the region of the first detection target that can be estimated from the region of the second detection target detected by the second detection unit.

12. The subject detection device according to claim 10, wherein the control unit controls to display in the predetermined mode when the size of the region of the first detection target detected by the first detection unit is more than or equal to a first threshold, and wherein the third threshold is smaller than the first threshold.

13. The subject detection device according to claim 1, further comprising:

a setting unit configured to set an evaluation region for acquiring a signal used in predetermined control, wherein the setting unit sets the evaluation region based on the region of the first detection target.

14. The subject detection device according to claim 13, wherein the predetermined control includes at least one of focusing control and exposure control.

15. The subject detection device according to claim 1, wherein the region of the first detection target is a human face region and the region of the second detection target is a region including a human face and a human body.

16. An imaging apparatus comprising:

the subject detection device according to claim 1; and an imaging unit configured to generate an image by performing photoelectric conversion on a subject image.

17. A control method for a subject detection device, the method comprising:

a first detection step of detecting a region of a first detection target from an image;

a second detection step of detecting from the image a region of a second detection target from which the region of the first detection target can be estimated; and a control step of controlling to display in a predetermined mode indicating a region of the first detection target if a predetermined condition is satisfied, wherein when the region of the first detection target is detected by the first detection step and the region of the second detection target is detected by the second detection step when display in the predetermined mode is not conducted, the predetermined condition is reduced in the control step as compared with when the region of the second detection target is not detected.

18. A storage medium storing a program configured to execute the control method for the subject detection device, the control method comprising:

a first detection step of detecting a region of a first detection target from an image;

a second detection step of detecting from the image a region of a second detection target from which the region of the first detection target can be estimated; and a control step of controlling to display in a predetermined mode indicating a region of the first detection target if a predetermined condition is satisfied, wherein when the region of the first detection target is detected by the first detection step and the region of the second detection target is detected by the second detection step when display in the predetermined mode is not conducted, the predetermined condition is reduced in the control step as compared with when the region of the second detection target is not detected.

* * * * *